United States Patent
Boucher et al.

(10) Patent No.: US 11,893,080 B2
(45) Date of Patent: Feb. 6, 2024

(54) COMPUTING DEVICE AND METHOD USING A NEURAL NETWORK TO DETERMINE WHETHER OR NOT TO PROCESS IMAGES OF AN IMAGE FLOW

(71) Applicant: Distech Controls Inc., Brossard (CA)

(72) Inventors: Jean-Simon Boucher, Sainte-Julie (CA); Francois Gervais, Lachine (CA)

(73) Assignee: Distech Controls Inc., Brossard (CA)

( * ) Notice: Subject to any disclaimer, the term of this patent is extended or adjusted under 35 U.S.C. 154(b) by 380 days.

(21) Appl. No.: 17/174,818

(22) Filed: Feb. 12, 2021

(65) Prior Publication Data
US 2022/0261592 A1 Aug. 18, 2022

(51) Int. Cl.
*G06V 20/52* (2022.01)
*G06N 3/08* (2023.01)
(Continued)

(52) U.S. Cl.
CPC .......... *G06F 18/211* (2023.01); *G06F 18/214* (2023.01); *G06N 3/04* (2013.01); *G06N 3/08* (2013.01); *G06T 7/20* (2013.01); *G06V 10/147* (2022.01); *G06V 10/774* (2022.01); *G06V 10/82* (2022.01); *G06V 20/52* (2022.01); *G06V 40/10* (2022.01); *G06T 2207/10024* (2013.01); *G06T 2207/10048* (2013.01); *G06T 2207/20081* (2013.01); *G06T 2207/20084* (2013.01); *G06T 2207/30196* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS 8,964,298 B2   2/2015  Haddick et al.
2017/0046575 A1* 2/2017  Zhao ................. B66B 27/00
(Continued)

FOREIGN PATENT DOCUMENTS

CN  112268352 A * 1/2021 ............. F24F 11/62

OTHER PUBLICATIONS

Ullah, Fath U. Min, et al. "Violence detection using spatiotemporal features with 3D convolutional neural network." Sensors 19.11 (2019): 2472. (Year: 2019).*

(Continued)

*Primary Examiner* — Sean M Conner
(74) *Attorney, Agent, or Firm* — RatnerPrestia

(57) ABSTRACT

Method and computing device using a neural network to determine whether or not to process images of an image flow. A predictive model of the neural network is generated and stored at a computing device. The computing device receives (b) an image of the image flow and executes (c) the neural network, using the predictive model for generating an indication of whether or not to process the image based on input(s) of the neural network, the input(s) comprising the image. The computing device determines (d) whether or not to process the image by an image processing module, based on the indication of whether or not to process the image. The image is processed by the image processing module if the determination is positive and not processed if the determination is negative. Steps (b), (c), (d) are repeated for consecutive images of the image flow.

24 Claims, 10 Drawing Sheets

(51) Int. Cl.
*G06F 18/211* (2023.01)
*G06T 7/20* (2017.01)
*G06N 3/04* (2023.01)
*G06V 10/147* (2022.01)
*G06V 40/10* (2022.01)
*G06F 18/214* (2023.01)
*G06V 10/774* (2022.01)
*G06V 10/82* (2022.01)

(56) References Cited

U.S. PATENT DOCUMENTS

| | | | | |
|---|---|---|---|---|
| 2019/0310589 A1* | 10/2019 | Gervais | ............... | G06V 10/143 |
| 2020/0234057 A1* | 7/2020 | Koo | ................. | H04N 5/268 |
| 2021/0185265 A1* | 6/2021 | Wong | ................ | H04N 25/79 |
| 2022/0004823 A1* | 1/2022 | Shoshan | .............. | G06F 18/214 |

OTHER PUBLICATIONS

Marsden, Mark, et al. "Fully convolutional crowd counting on highly congested scenes." arXiv preprint arXiv: 1612.00220 (2016). (Year: 2016).*

* cited by examiner

COMPUTING DEVICE AND METHOD USING A NEURAL NETWORK TO DETERMINE WHETHER OR NOT TO PROCESS IMAGES OF AN IMAGE FLOW

TECHNICAL FIELD

The present disclosure relates to the field of image processing. More specifically, the present disclosure presents a computing device and method using a neural network to determine whether or not to process images of an image flow.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from sensors, and in turn determines set-points or command parameters to be sent to controlled appliances.

One type of sensor used in the context of environment control systems is an imaging sensor, such as for example an infrared (IR) camera or a visible light camera. The flow of images (referred to as image flow in the following) generated by the imaging sensor may have different applications, such as detecting the presence of a person in an area, counting the number of persons present in an area, determining the direction of movement of a person in an area, etc. A result of the analysis of the image flow is used, generally in combination with data from other sensors (e.g. a temperature sensor), by an environment controller for controlling operations of one or more controlled appliance. For example, a heater or a light is switched on when the analysis of the image flow is indicative of the presence of one or more person in the area, and switched off when the analysis of the image flow is indicative of the absence of any person in the area.

The image flow generated by the imaging sensor is processed by an image processing functionality executed by one (or more) processor. The usage of neural network(s) to implement image processing functionalities is more and more frequent. Neural networks are processing intensive, in particular in the case of image processing. For example, if the image flow has a frame rate of 30 frames per second (FPS), the neural network performs 30 iterations of processing of image(s) per second. The workload of the processor(s) dedicated to the image processing functionality is generally a high percentage of the available workload, which may prevent other applications to be executed by the processor(s) in parallel to the image processing functionality. In the case of embedded processor(s) for Internet of Things (IoT) devices, the embedded processor may simply not have the capability to execute the image processing functionality at a frame rate of 30 FPS.

For specific types of image processing functionalities, not all images of the image flow are useful for adequately implementing the image processing functionality. One exemplary use case is the detection of the presence of a person in an area (and optionally the detection of the direction of movement of the person). Some images carry redundant information with respect to one or more previous image in the image flow. For instance, having a series of N consecutive images with the same person present and standing still, only one or a few images of the series of N consecutive images is sufficient for the image processing functionality to perform the detection of the presence of the person in the area. It would be advantageous in these conditions to reduce the frame rate of the image flow, by only passing a portion of the images to the image processing functionality and to avoid processing the other images.

Therefore, there is a need for a computing device and method using a neural network to determine whether or not to process images of an image flow.

SUMMARY

According to a first aspect, the present disclosure relates to a computing device. The computing device comprises a communication interface, memory, and a processing unit comprising one or more processor. The memory stores a predictive model generated by a neural network training engine. The processing unit is configured to receive an image via the communication interface, the image being part of an image flow received from an imaging sensor. The processing unit is configured to execute a neural network inference engine implementing a neural network. The neural network uses the predictive model for generating an indication of whether or not to process the image based on one or more input of the neural network, the one or more input comprising the image. The processing unit is configured to determine whether or not to process the image by an image processing module based on the indication of whether or not to process the image. The processing unit is configured to process the image by the image processing module if the determination is positive and not process the image by the image processing module if the determination is negative.

According to a second aspect, the present disclosure relates to a method using a neural network to determine whether or not to process images of an image flow. The method comprises storing in a memory of a computing device a predictive model generated by a neural network training engine. The method comprises receiving by a processing unit of the computing device an image of the image flow. The method comprises executing by the processing unit of the computing device a neural network inference engine implementing the neural network. The neural network uses the predictive model for generating an indication of whether or not to process the image based on one or more input of the neural network, the one or more input comprising the image. The method comprises determining by the processing unit of the computing device whether or not to process the image by an image processing module executed by the processing unit of the computing device based on the indication of whether or not to process the image. The method comprises processing the image by the image processing module if the determination is positive and not processing the image by the image processing module if the determination is negative.

According to a third aspect, the present disclosure relates to a method for training a neural network to determine whether or not to process images of an image flow. The method comprises (a) initializing by a processing unit of a computing device a predictive model of a neural network. The method comprises (b) generating by the processing unit of the computing device training data. The generation of the training data comprises generating a plurality of image flows, each image flow comprising a plurality of images. The generation of the training data further comprises determining for each image of the plurality of image flows a target indication, the target indication indicating whether or not to process the image by an image processing module. The method comprises (c) executing by the processing unit of the computing device a neural network training engine implementing the neural network. The neural network uses the predictive model for generating an inferred indication of whether or not to process a given image of a given image flow among the plurality of image flows based on one or more input, the one or more input comprising the given image of the given image flow. The method comprises (d) adjusting by the processing unit of the computing device the predictive model of the neural network, to minimize a difference between the inferred indication and the target indication determined for the given image of the given image flow.

In a particular aspect, steps (c) and (d) of the training method are repeated for several images of the given image flow and for several given image flows belonging to the plurality of image flows generated at step (b).

BRIEF DESCRIPTION OF THE DRAWINGS

Embodiments of the disclosure will be described by way of example only with reference to the accompanying drawings, in which.

DETAILED DESCRIPTION

Figure 1:
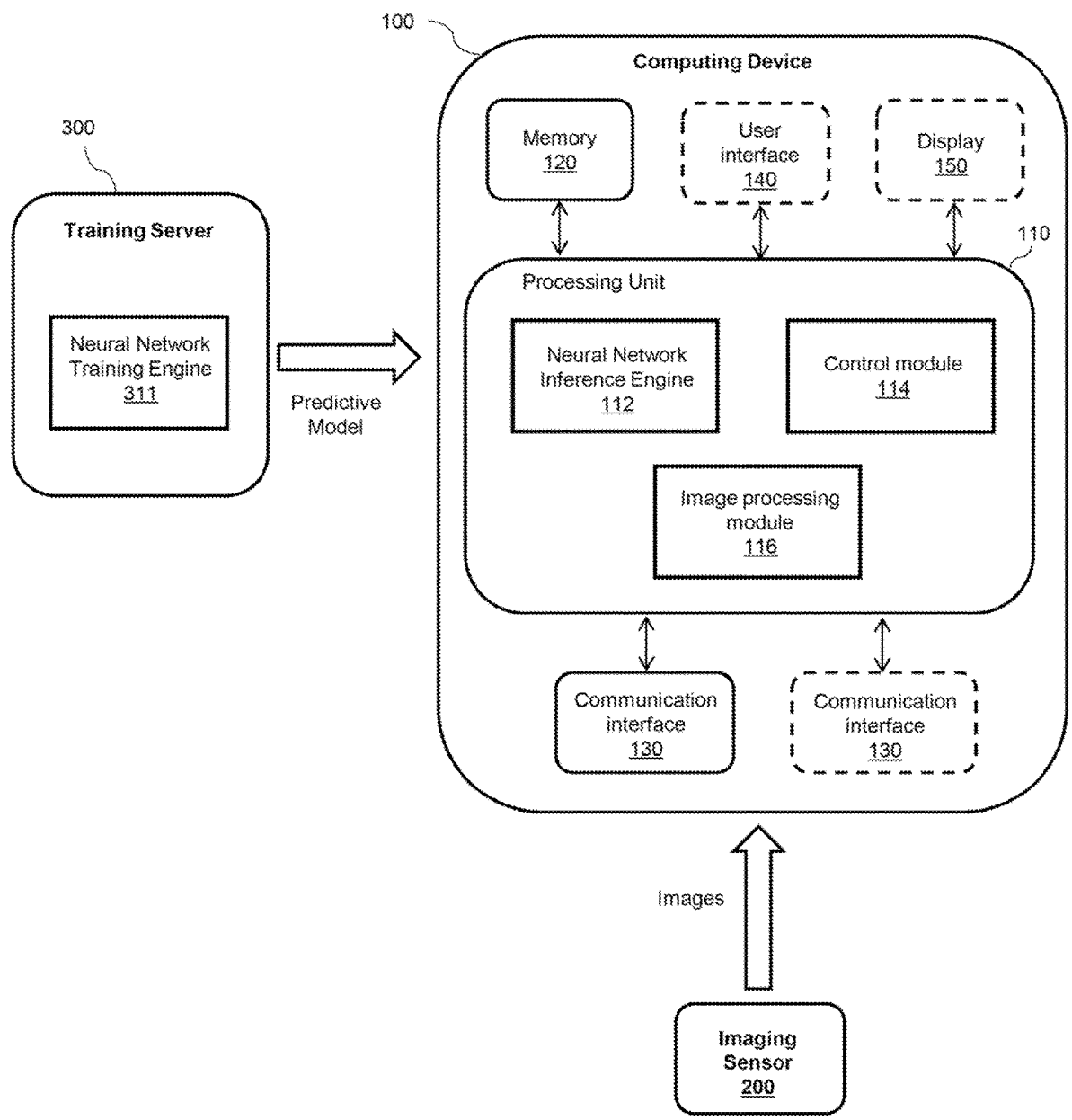
FIG. 1 illustrates an environment control system comprising a computing device and an imaging sensor.

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for reducing the frame rate of an image flow generated by an imaging sensor, to reduce the workload consumed for processing the image flow by an image processing functionality. In the context of an environment control systems, the image processing functionality may be used to determine the number of persons present in the images of the image flow.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, $CO_2$, flow, radiation, water level, speed, sound; a variation of at least one of the following, temperature, pressure, humidity and lighting, $CO_2$ levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: the expression 'area of a building' is used throughout the present specification to refer to the interior of a whole building or a portion of the interior of the building such as, without limitation: a floor, a room, an aisle, etc.

Figure 2:
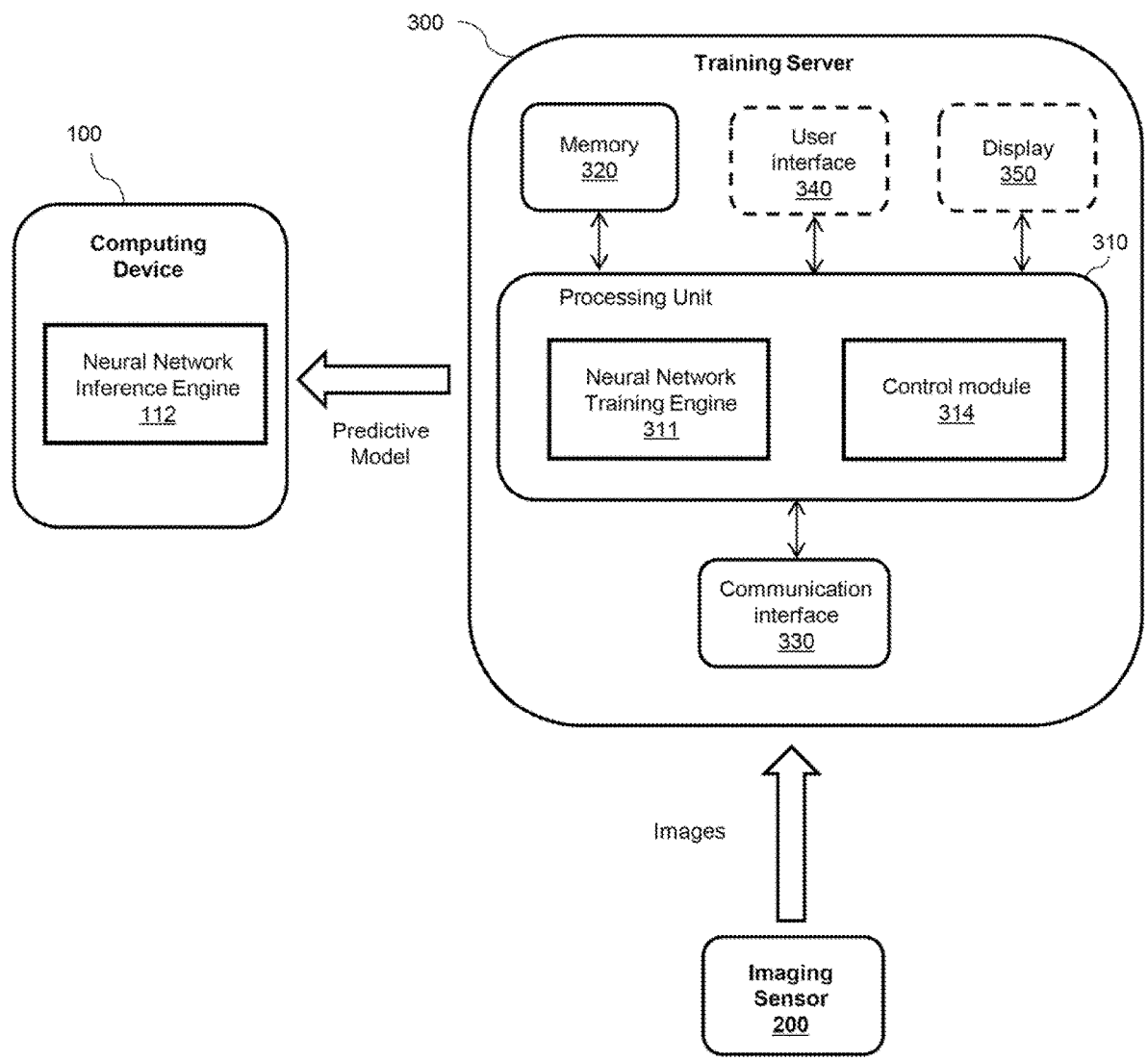
FIG. 2 provides a detailed representation of a training server represented in FIG. 1.

Referring now concurrently to FIGS. 1 and 2, an environment control system comprising a computing device 100 is illustrated. For example, the computing device 100 is an environment controller 100 exchanging data with other environment control devices (ECDs). The environment controller 100 is responsible for controlling the environment of an area of a building. The environment controller 100 receives from sensors (e.g. an imaging sensor 200, a temperature sensor not represented in the Figures, etc.) environmental characteristic values measured by the sensors. The environment controller 100 generates commands based on the received environmental characteristic values. The generated commands are transmitted to controlled appliances (not represented in the Figures for simplification purposes), to control operations of the controlled appliances.

The area under the control of the computing device 100 is not represented in the Figures for simplification purposes. As mentioned previously, the area may consist of a room, a floor, an aisle, etc. However, any type of area located inside any type of building is considered being within the scope of the present disclosure. Furthermore, the present disclosure may also be applied to an outdoor environment.

Details of the computing device 100, the imaging sensor 200 and the training server 300 will now be provided.

As illustrated in FIG. 1, the computing device 100 comprises a processing unit 110, memory 120, and a communication interface 130. The computing device 100 may comprise additional components, such as another communication interface 130, a user interface 140, a display 150, etc.

The processing unit 110 comprises one or more processors (not represented in the Figures) capable of executing instructions of a computer program. Each processor may further comprise one or several cores. The processing unit 110 executes a neural network inference engine 112, a control module 114 and an image processing module 116, as will be detailed later in the description.

The memory 120 stores instructions of computer program(s) executed by the processing unit 110 (for implementing the neural network inference engine 112, the control module 114, the image processing module 116, etc.), data generated by the execution of the computer program(s), data received via the communication interface 130 (or another communication interface), etc. Only a single memory 120 is represented in FIG. 1, but the environment controller 100 may comprise several types of memories, including volatile memory (such as a volatile Random Access Memory (RAM), etc.) and non-volatile memory (such as a hard drive, electrically-erasable programmable read-only memory (EEPROM), flash, etc.).

The communication interface 130 allows the computing device 100 to exchange data with remote devices (e.g. with the imaging sensor 200, controlled appliance(s), a training server 300, etc.) over a communication network (not represented in FIG. 1 for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network, Bluetooth®, Bluetooth® Low Energy (BLE), etc. In still another example, the environment controller 100 comprises two communication interfaces 130. The environment controller 100 communicates with the imaging sensor 200 and controlled appliance(s) via a first communication interface 130 (e.g. a Wi-Fi interface); and communicates with other devices (e.g. the training server 300) via a second communication interface 130 (e.g. an Ethernet interface). Each communication interface 130 usually comprises a combination of hardware and software executed by the hardware, for implementing the communication functionalities of the communication interface 130.

The imaging sensor 200 consists of any type of sensor capable of generating images and transmitting the images to another device (e.g. to the computing device 100). Examples of imaging sensors relevant to the present disclosure include (without limitations) an infrared (IR) camera, a visible light camera, etc. The imaging sensor 200 operates at a given frame rate, generally defined by a number of frames per second (FPS). For example, an imaging sensor operating at 30 FPS generates and transmits 30 images per second. In the rest of the disclosure, the terms frame and image will be used interchangeably.

The details of the implementation of various types of imaging sensors are well known in the art, and are out of the scope of the present disclosure. Consequently, the components of the imaging sensor 200 are not represented in FIG. 1 for simplification purposes. An exemplary imaging sensor 200 comprises a processing unit, memory, a communication interface, and an image sensing component. The image sensing component (e.g. an IR sensing component) generates raw data, which are processed by the processing unit to generate images (e.g. IR images), the images being transmitted to other device(s) via the communication interface.

As illustrated in FIG. 2, the training server 300 comprises a processing unit 310, memory 320 and a communication interface 330. The training server 300 may comprise additional components, such as a user interface 340, a display 350, etc.

The processing unit 310 of the training server 300 is similar to the processing unit 110 of the computing device 100. The processing unit 310 executes a neural network training engine 311 and a control module 314, as will be detailed later in the description.

The memory 320 of the training server 300 is similar to the memory 120 of the computing device 100. The memory 320 stores instructions of computer program(s) executed by the processing unit 310 for implementing the neural network training engine 311, the control module 314, etc.

The communication interface 330 of the training server 300 is similar to the communication interface 130 of the computing device 100. The communication interface 330 allows the training server 300 to exchange data with remote devices (e.g. with the computing device 100, etc.) over a communication network (not represented in FIG. 3 for simplification purposes).

The execution of the neural network training engine 311 generates a predictive model of a neural network, which is transmitted to the computing device 100 via the communication interface 330 of the training server 300. The predictive model is transmitted over a communication network and received via the communication interface 130 of the computing device 100.

Figure 3:
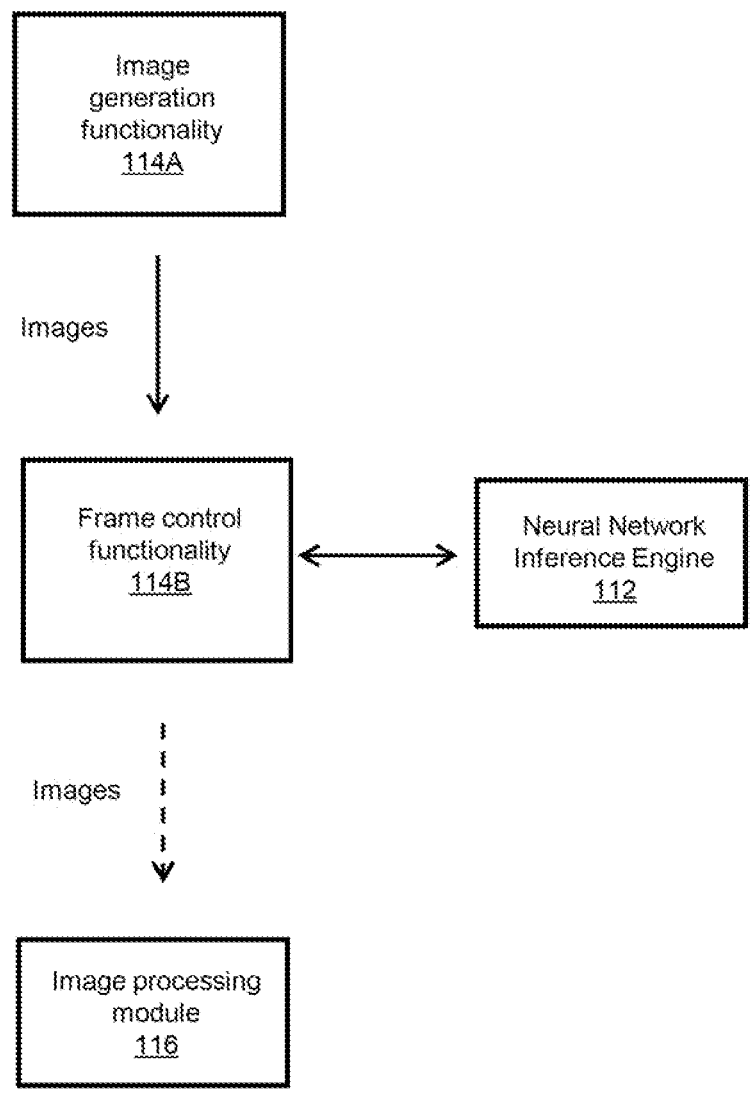
FIG. 3 illustrates functionalities implemented by the computing device of FIG. 1 for reducing a frame rate of an image flow.

Referring now concurrently to FIGS. 1 and 3, a process for reducing a frame rate of the flow of generated by the imaging sensor 200 is represented. The flow of images will be referred to as the image flow in the following. All the functionalities and modules illustrated in FIG. 3 are executed by the processing unit 110 of the computing device 100.

The image generation functionality 114A is a functionality implemented by the control module 114. The image generation functionality 114A generates an image flow at a nominal frame rate. For example, the image generation functionality 114A receives images from the imaging sensor 200 via the communication interface 130, optionally applies pre-processing(s) to the images received from the imaging sensor 200, and makes the images available to the image processing module 116. The type of pre-processing(s) which may be applied to the image flow is well known in the art (e.g. rescaling) and is out of the scope of the present disclosure.

The image flow is received and processed by the image processing module 116. Various types of image processing functionalities may be implemented by the image processing module 116. The present disclosure is aimed at image processing functionalities which require processing capabilities which may not be supported by the processing unit 110. More specifically, the image processing module 116 is not capable of handling the nominal frame rate of the image flow. Alternatively, the processing unit 110 is capable of supporting the image processing module 116 when operating at the nominal frame rate, but at the expense of other applications which cannot be executed by the processing unit 110 in parallel to the image processing module 116.

For example, the image processing module 116 uses a neural network for detecting at least one of the presence of person(s), the number of person(s) and the direction of movement of detected person(s), in the field of view of the imaging sensor 200. Instead of person(s), the detection functionality may be applied to the detection/counting/movement analysis of object(s) in the field of view of the imaging sensor 200. The neural network implemented by the image processing module 116 uses as input at least one image (and possibly a plurality of consecutive images) for performing each inference. For instance, if the nominal frame rate is 30 FPS, the neural network needs to be capable of performing 30 inferences per second. The processing unit 110 is not capable of supporting the workload of processing via a neural network image(s) at a rate of 30 inferences per second; or alternatively is capable of supporting the workload, but at the expense of the execution of other applications as mentioned previously.

Other types of image processing functionalities implemented by the image processing module 116, which may lead to an unbearable (or at least unacceptable) workload for the processing unit 110 at the nominal frame rate, are also within the scope of the present disclosure.

The frame control functionality 114B is a functionality implemented by the control module 114, which determines if an image generated by the image generation functionality 114A is transferred or not to the image processing module 116. By not transferring a portion of the images generated by the image generation functionality 114A, the frame rate applied to the image processing module 116 is reduced to a level below the nominal frame rate. The reduced frame rate allows the image processing module 116 to operate at a workload which can be supported by the processing unit 110 (e.g. for allowing other applications to be executed in parallel).

The neural network inference engine 112 is used for deciding whether a given image is transferred or not by the frame control functionality 114B. The neural network inference engine 112 implements a neural network which uses the given image as input and generates the decision as output. The neural network implemented by the neural network inference engine 112 is designed to have a low impact on the workload of the processing unit 110. In particular, the processing power consumed by the neural network inference engine 112 is significantly lower than the processing power consumed by the image processing module 116. Consequently, the processing unit 110 is capable of supporting the neural network inference engine 112 operating at the nominal frame rate and the image processing module 116 operating at the reduced frame rate. For example, the nominal frame rate is 30 FPS while the reduced frame rate is 10 FPS (only one image out of three generated by the image generation functionality 114A is transferred to the image processing module 116, the other images being dropped).

During a training phase, the neural network implemented by the neural network inference engine 112 is trained to identify which images shall be transferred to the image processing module 116. At the end of the training, the neural network implemented by the neural network inference engine 112 has acquired the capability to decide whether an image shall be transferred or not.

Figure 4:
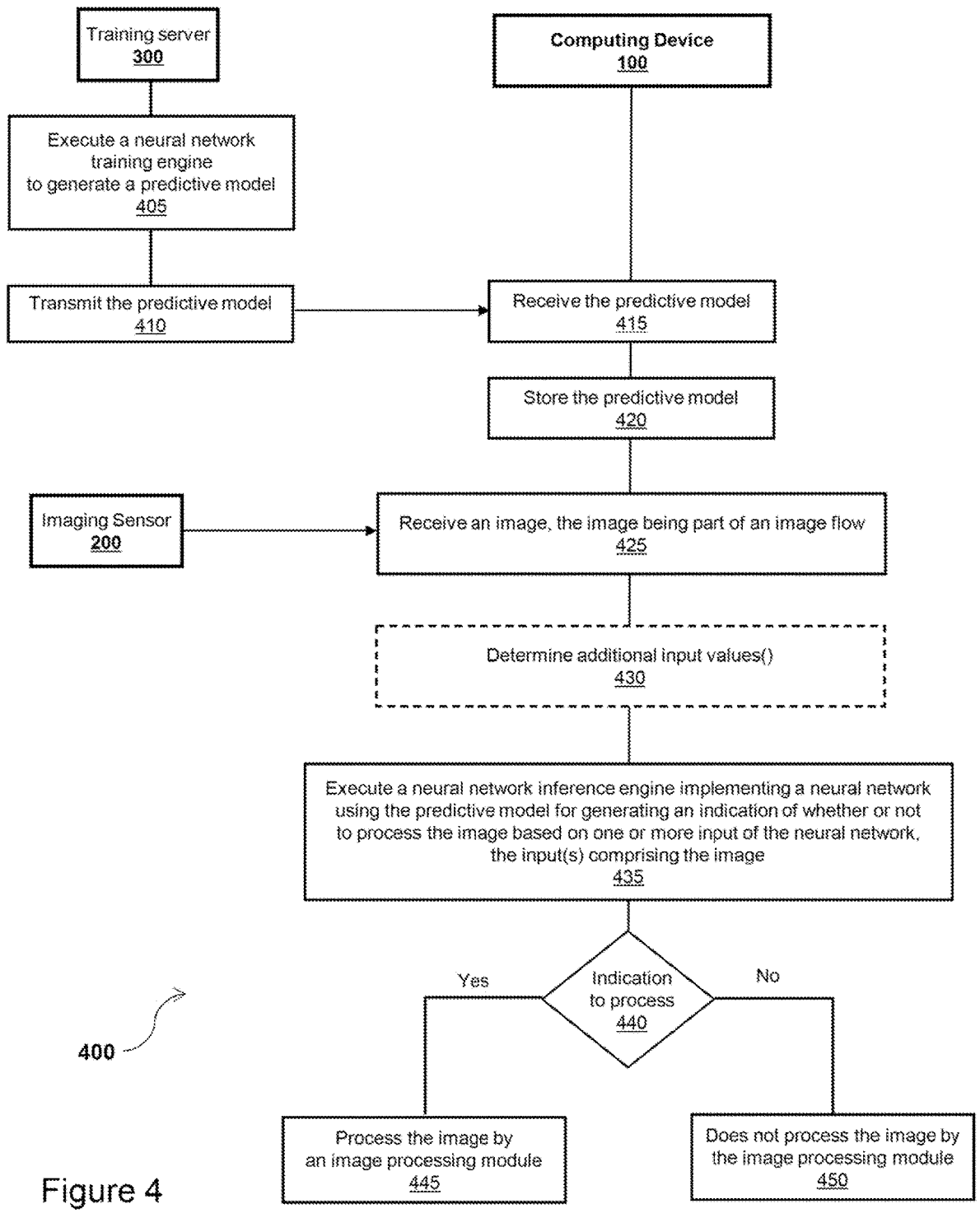
FIG. 4 illustrates a method implemented by the computing device of FIG. 1, using a neural network to determine whether or not to process images of an image flow.

Reference is now made concurrently to FIGS. 1, 2, 3 and 4; where FIG. 4 represents a method 400. At least some of the steps of the method 400 are implemented by the computing device 100. The method 400 uses a neural network to determine whether or not to process images of an image flow. The present disclosure is not limited to the method 400 being implemented by the computing device 100 represented in FIG. 1, but is applicable to any type of computing device capable of implementing the steps of the method 400.

A dedicated computer program has instructions for implementing at least some of the steps of the method 400. The instructions are comprised in a non-transitory computer program product (e.g. the memory 120) of the computing device 100. The instructions provide for using a neural network to determine whether or not to process images of an image flow, when executed by the processing unit 110 of the computing device 100. The instructions are deliverable to the computing device 100 via an electronically-readable media such as a storage media (e.g. CD-ROM, USB key, etc.), or via communication links (e.g. via a communication network through the communication interface 130).

The instructions of the dedicated computer program executed by the processing unit 110 implement the neural network inference engine 112, the control module 114 and the image processing module 116. The neural network inference engine 112 provides functionalities of a neural network, allowing to infer output(s) based on inputs using the predictive model (generated by the training server 300), as is well known in the art. The control module 114 provides functionalities allowing the computing device 100 to interact with and control other devices (e.g. the imaging sensor 200 and the training server 300). The control module 114 also provides functionalities for managing an image flow via the image generation functionality 114A and the frame control functionality 114B illustrated in FIG. 3. The image processing module 116 has been described previously in relation to FIG. 3.

The method 400 comprises the step 405 of executing the neural network training engine 311 to generate the predictive model. Step 405 is performed by the processing unit 310 of the training server 300. The predictive model comprises parameters of a neural network implemented by the neural network training engine 311. This step will be further detailed later in the description and details relative to the parameters of the neural network will be provided.

The method 400 comprises the step 410 of transmitting the predictive model generated at step 405 to the computing device 100, via the communication interface 330 of the training server 300. Step 410 is performed by the processing unit 310 of the training server 300.

The method 400 comprises the step 415 of receiving the predictive model from the training server 300, via the communication interface 130 of the computing device 100. Step 415 is performed by the processing unit 110 of the computing device 100.

The method 400 comprises the step 420 of storing the predictive model in the memory 120 of the computing device 100. Step 420 is performed by the processing unit 110 of the computing device 100.

The method 400 comprises the step 425 of receiving an image, the image being part of an image flow. Step 425 is performed by the processing unit 110 of the computing device 100.

In the implementation illustrated in FIG. 1, each image of the image flow is generated by the imaging sensor 200, transmitted by the imaging sensor 200 to the computing device 100, and received via the communication interface 130 of the computing device 100. As mentioned previously, the imaging sensor 200 operates at a nominal frame rate.

In an alternative implementation not represented in the Figures for simplification purposes, the imaging sensor 200 is not a standalone device but is a component integrated to the computing device 100. The integrated imaging component directly transmits the image flow to the processing unit 110 (e.g. via an internal communication bus of the computing device 100). For example, the computing device is a camera combining the functionalities of the imaging sensor 200 and the computing device 100, an IoT device 100 embedding an imaging sensor, etc.

The method 400 is applicable to any computing device 100 with a processing unit 110 receiving an image flow according to step 425, where the image flow is generated by any means internal or external to the computing device 100.

The method 400 comprises the optional step 430 of determining one or more additional input value. Each additional input value is determined by one of the following means: directly generating the additional input value by the processing unit 110, receiving the additional input value via the communication interface 130, receiving the additional input value via the user interface 140, etc. Step 430 is performed by the processing unit 110 of the computing device 100. Step 430 may be performed before step 425.

The method 400 comprises the step 435 of executing the neural network inference engine 112. The neural network inference engine 112 implements a neural network using the predictive model (stored at step 420) for generating an output based on one or more input of the neural network. The execution of the neural network inference engine 112 is performed by the processing unit 110 of the computing device 100. This step will be further detailed later in the description, by providing exemplary implementations of the neural network.

The one or more input comprises the image received at step 425, and optionally one or more additional input value received at step 430. The output consists of an indication of whether or not to process the image. Additional output(s) may be generated by the neural network inference engine 112.

During the training phase, the predictive model is generated by the neural network training engine 311 using exactly the same input(s) and output(s) as those used at step 435 by the neural network inference engine 112.

The method 400 comprises the step 440 performed by the processing unit 110 of the computing device 100. Step 440 consists in determining whether or not to process the image received at step 425 by the image processing module 116, based on the indication of whether or not to process the image (generated at step 435). The indication of whether or not to process the image may be implemented in different ways, depending on the characteristics of the neural network executed at step 435.

The method 400 comprises the steps 445 and 450 performed by the processing unit 110 of the computing device 100. For each image received at step 425, one of step 445 (processing the image by the image processing module 116) or step 450 (not processing the image by the image processing module 116) is performed, based on the determination made at step 440. If the determination is positive (process), step 445 is performed. If the determination is negative (do not process), step 450 is performed.

In a first exemplary implementation, the indication of whether or not to process the image is a Boolean value. The image is processed by the image processing module 116 if the Boolean value is true (step 445) and the image is not processed by the image processing module 116 if the Boolean value is false (step 450).

In a second exemplary implementation, the indication of whether or not to process the image is a percentage value. The image is processed by the image processing module 116 if the percentage value is greater (or equal) than a threshold (step 445) and the image is not processed by the image processing module 116 otherwise (step 450). For example, the image is processed if the percentage is greater or equal than 80% and not processed if the percentage is lower than 80%.

As person skilled in the art would readily understand that the indication of whether or not to process the image may be implemented with other types of values (which can be generated as an output of a neural network).

An exemplary implementation of step 450 consists in simply dropping the image received at step 425. With respect to step 445, an exemplary implementation of the image processing module 116 consists in determining a number of persons (or objects) present in the image.

Steps 415, 420, 425, 430, 440 and 450 of the method 400 are performed by the control module 114 executed by the processing unit 110. In the implementation illustrated in FIG. 3, step 425 is performed by the image generation functionality 114A of the control module 114 and steps 440, 450 are performed by the frame control functionality 114B of the control module 114. As mentioned previously, step 435 is performed by the neural network inference engine 112 and step 445 is performed by the image processing module 116.

Steps 425-450 are repeated for each image of the image flow received at step 425. As mentioned previously, the method 400 reduces the nominal frame rate (e.g. 30 FPS) of the image flow received at step 425 to the reduced frame rate (e.g. 10 FPS) perceived by the image processing module 116 at step 445. It should be noted that the nominal frame rate is generally constant, while the reduced frame rate may vary over time, depending on the proportion of images which are not processed by the image processing module 116. The objective of the method 400 is to maximize the proportion of images not being processed, without degrading the accuracy/quality of the functionality implemented by the image processing module 116.

Figure 5:
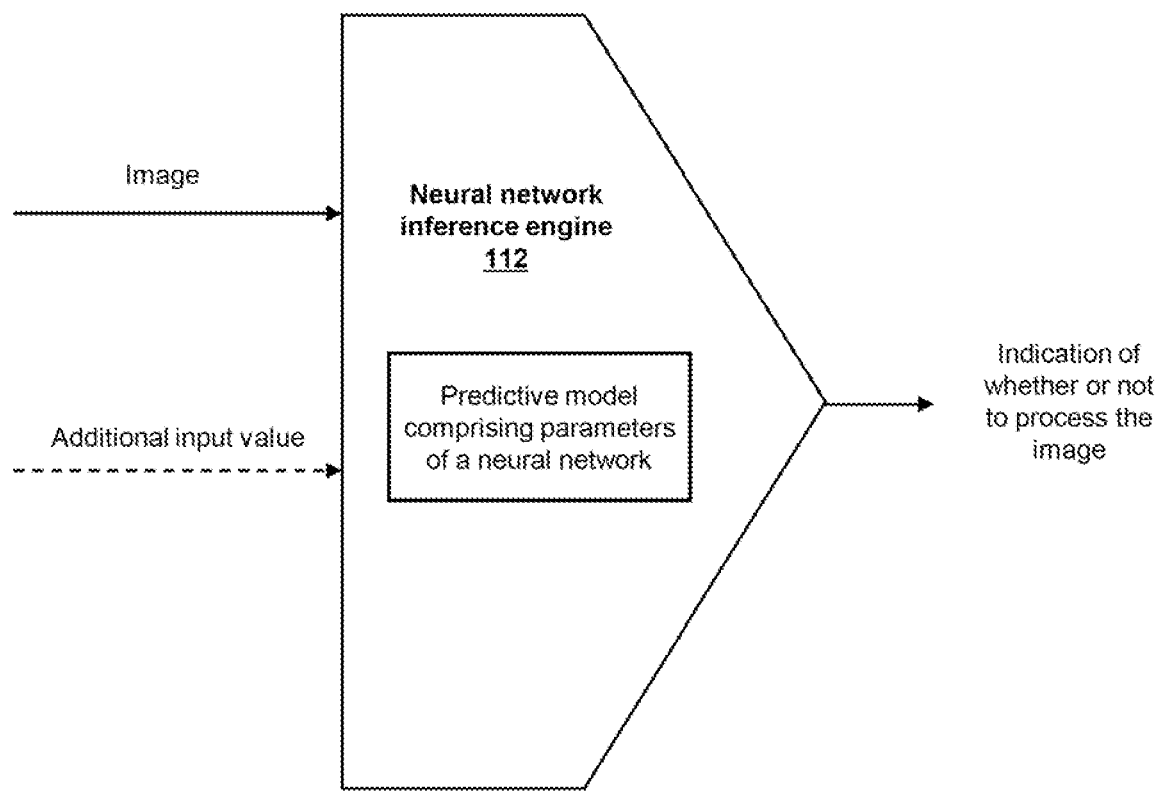
FIG. 5 is a schematic representation of a neural network inference engine executed by the computing device of FIG. 1 according to the method of FIG. 4.

Referring to FIGS. 1, 4 and 5, a schematic representation of the neural network inference engine 112 is illustrated, representing the inputs and the outputs used by the neural network inference engine 112 when performing step 435 of the method 400. For illustration purposes, the inputs include one optional additional input value in FIG. 5. However, the inputs may include zero, one or more additional input value(s).

Referring to FIGS. 1, 4, 5, 6A and 6B, exemplary detailed representations of the neural network implemented by the neural network inference engine 112 are illustrated.

As is well known in the art, the neural network includes an input layer for receiving the image and the optional additional input value(s), one or more hidden layer, and an output layer for outputting the indication of whether or not to process the image.

Figure 6A:
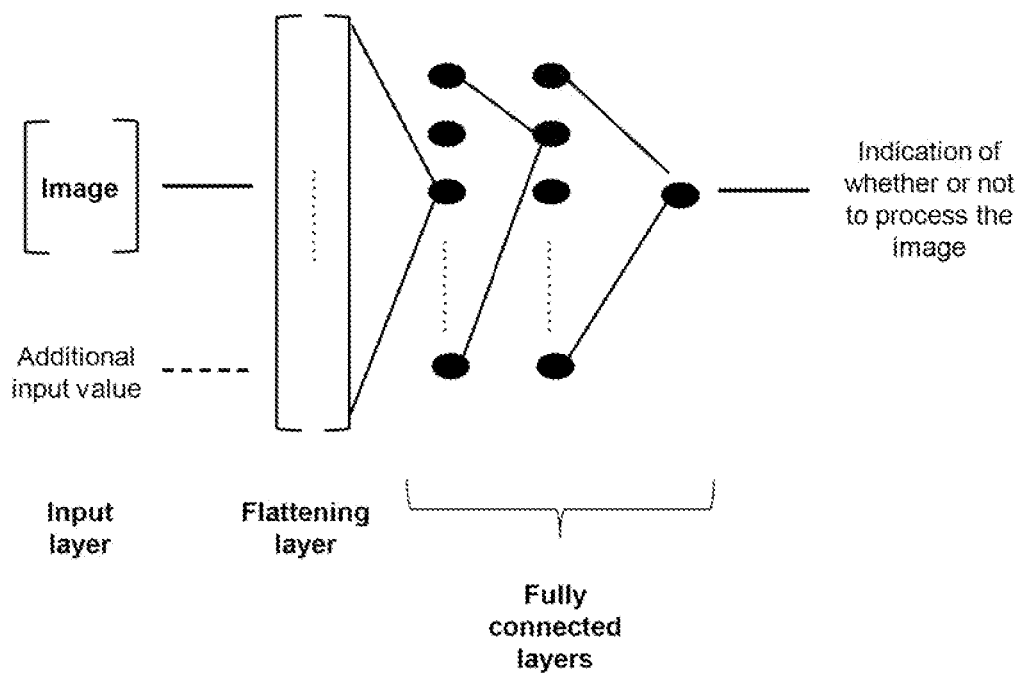
FIGS. 6A and 6B illustrate exemplary implementations of a neural network implemented by the neural network inference engine of FIG. 5.

In a first exemplary implementation illustrated in FIG. 6A, the neural network includes an input layer for receiving the image, followed by a flattening layer, followed by a plurality of fully connect layers. The last layer among the plurality of fully connected layers is the output layer.

In general, neural networks used in the processing of images have a first layer adapted to receive an array of dimension 2 or greater, representing the image. The flattening layer is adapted for converting the data of the image into a 1-dimensional array (also referred to as a vector) for inputting it to the next layer.

For example, the imaging sensor 200 is an IR camera generating a two-dimensional (2D) thermal image. The digital representation of the 2D thermal image is a 2D array of temperature measurements having M columns and N rows (M and N being integers). The flattening layer comprises M*N neurons, each neuron receiving one temperature measurement among the M*N temperature measurements of the 2D array.

In another example, the imaging sensor 200 is a visual light camera generating a 2D Red-Green-Blue (RGB) image. Each pixel of the 2D image has three intensity values (e.g. three integers between 0 and 255) for respectively representing each one of the three RGB color components. The digital representation of the 2D RGB image is a 3D array of pixel intensity values having M columns and N rows (M and N being integers), and a third dimension of size 3 for the RGB color components. The flattening layer comprises M*N*3 neurons, each neuron receiving one pixel intensity value corresponding to one of the RGB color components of the pixels.

In the case where the inputs of the neural network include one or more additional input value, the flattening layer comprises one additional neuron for each additional input value.

The flattening layer is followed by the plurality of fully connected layers. The operations of the fully connected layers are well known in the art. The number of fully connected layers is an integer greater than 1 (FIG. 6A represents three fully connected layers for illustration purposes only). The number of neurons in each fully connected layer may vary. During the training phase of the neural network, the number of fully connected layers and the number of neurons for each fully connected layer are selected, and may be adapted experimentally.

The last one among the plurality of fully connected layers is the output layer, which comprises one neuron for outputting the indication of whether or not to process the image that was used as input of the neural network. The output layer may include additional neuron(s) for outputting additional output value(s).

In an alternative to the first exemplary implementation, the input layer receives a digital representation of the image already consisting of a vector (e.g. a vector of M*N temperature measurements, a vector of M*N*3 pixel intensity values corresponding to the RGB color components of the pixels, etc.). In this case, the neural network does not include the flattening layer represented in FIG. 6A.

Figure 6B:
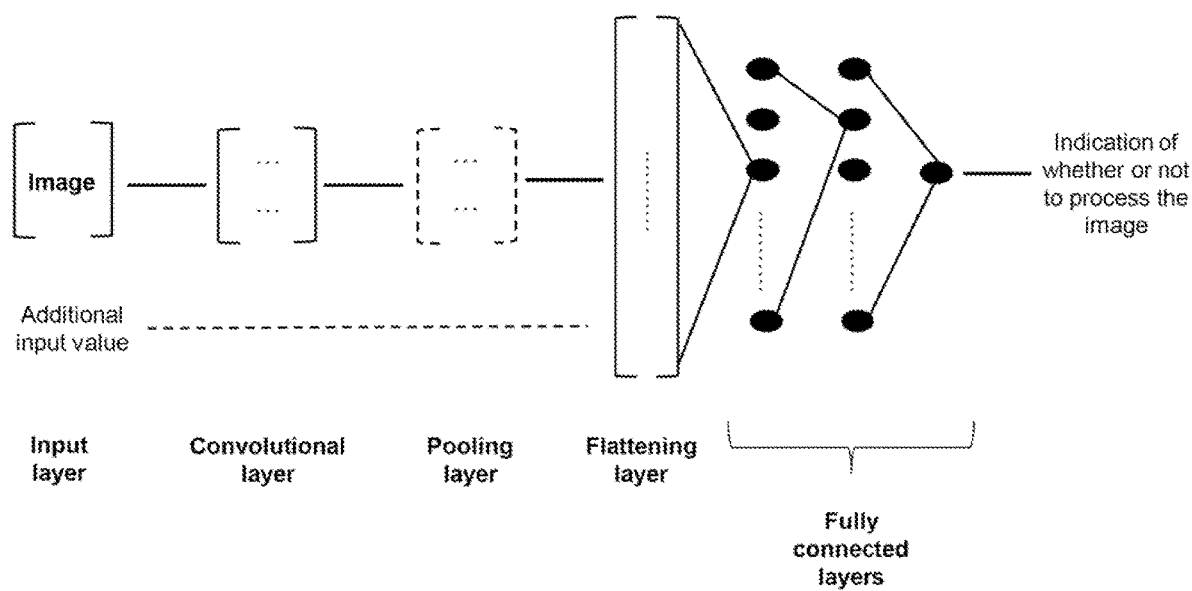

In a second exemplary implementation illustrated in FIG. 6B, the neural network includes an input layer for receiving the image, followed by a convolutional layer, optionally followed by a pooling layer, followed by a flattening layer, followed by a plurality of fully connect layers. The last layer among the plurality of fully connected layers is the output layer.

A convolutional layer is well known in the art. The convolutional layer applies a convolution to the image to generate a convoluted image.

Reference is now made to the previous example of the 2D thermal image digitally represented by a 2D array of temperature measurements having M columns and N rows. The convolutional layer generates a convoluted 2D array of temperature measurements. The 2D convolutional layer is defined by the following parameters: a two-dimensions filter and a stride. The convoluted 2D array comprises M' columns and N' rows, with M greater or equal than M' and N greater or equal than N'.

Reference is now made to the previous example of the 2D RGB image digitally represented by a 3D array of pixel intensity values having M columns and N rows, and a third dimension of size 3 for the RGB color components. The convolutional layer generates three convoluted 2D arrays of pixel intensity values, one for each of the RGB components. The 2D convolutional layer is defined by the following parameters: a two-dimensions filter and a stride (which may be the same or different for each RGB component). Each of the three convoluted 2D arrays comprise M' columns and N' rows, with M greater or equal than M' and N greater or equal than N'. Alternatively, a 3D convolution may be applied to the 3D array of pixel intensity values, resulting in a convoluted 3D array of pixel intensity values.

The convolutional layer is optionally followed by a pooling layer. If the output of the convolutional layer is one or more convoluted 2D array, the pooling layer generates one or more corresponding pooled 2D array. As is well known in the art, the pooling layer is defined by the following parameters: a two-dimensions filter, a stride and a pooling algorithm. If the convoluted 2D array comprises M' columns and N' rows, the pooled 2D array comprises M'' columns and N'' rows, with M' greater than M'' and N' greater than N''. The role of the pooling layer is to reduce the size of the 2D array(s) generated by the convolutional layer. In the case of a 3D convolutional layer generating a convoluted 3D array, the pooling layer generates a corresponding pooled 3D array.

The convolutional layer (or the pooling layer if it is present) is followed by a flattening layer, which operates in a manner which has been previously described in relation to FIG. 6A. Each value of the array(s) generated by the convolutional layer (or the pooling layer if it is present) is allocated to a dedicated neuron of the flattening layer.

In the case where the inputs of the neural network include one or more additional input value, the flattening layer comprises one additional neuron for each additional input value (each additional input value is not processed by the convolutional layer and optional pooling layer).

The flattening layer is followed by the plurality of fully connected layers, which operate in a manner which has been previously described in relation to FIG. 6A. In particular, the last one among the plurality of fully connected layers is the output layer, which comprises one neuron for outputting the indication of whether or not to process the image that was used as input of the neural network. The output layer may include additional neuron(s) for outputting additional output value(s).

Although a single convolution layer (and a corresponding optional pooling layer) is represented in FIG. 6B, several consecutive convolution layers (and corresponding optional pooling layers) may be included in the neural network, as is well known in the art.

In another implementation applicable to the neural networks represented in FIGS. 6A and 6B, the inputs of the neural network (when performing the current iteration of step 435) include the (current) image and an additional input value consisting of a previous indication generated by the neural network when processing a previous image of the image flow (at a previous iteration of step 435). The (current) indication generated by the neural network (when performing the current iteration of step 435) is stored in the memory 120 of the computing device 100. The (current) indication is used as input of the neural network (at the next iteration of step 435), along with a following image of the image flow.

For example, we consider three consecutive images img_1, img_2 and img_3 received consecutively at step 425 of the method 400. The processing of img_1 by the neural network at step 435 generates the indication ind_1, which is stored in the memory 120. For the processing of img_2 by the neural network at step 435, the inputs include img_2 and ind_1; and the processing by the neural network generates the indication ind_2, which is stored in the memory 120. For the processing of img_3 by the neural network at step 435, the inputs include img_3 and ind_2; and the processing by the neural network generates the indication ind_3, which is stored in the memory 120 (to be used as input for the processing of the next image). As mentioned previously, the flattening layer represented in FIGS. 6A and 6B comprises a dedicated neuron for receiving the previous indication (which is not processed by the convolutional layer and optional pooling layer of FIG. 6B).

Figure 7A:
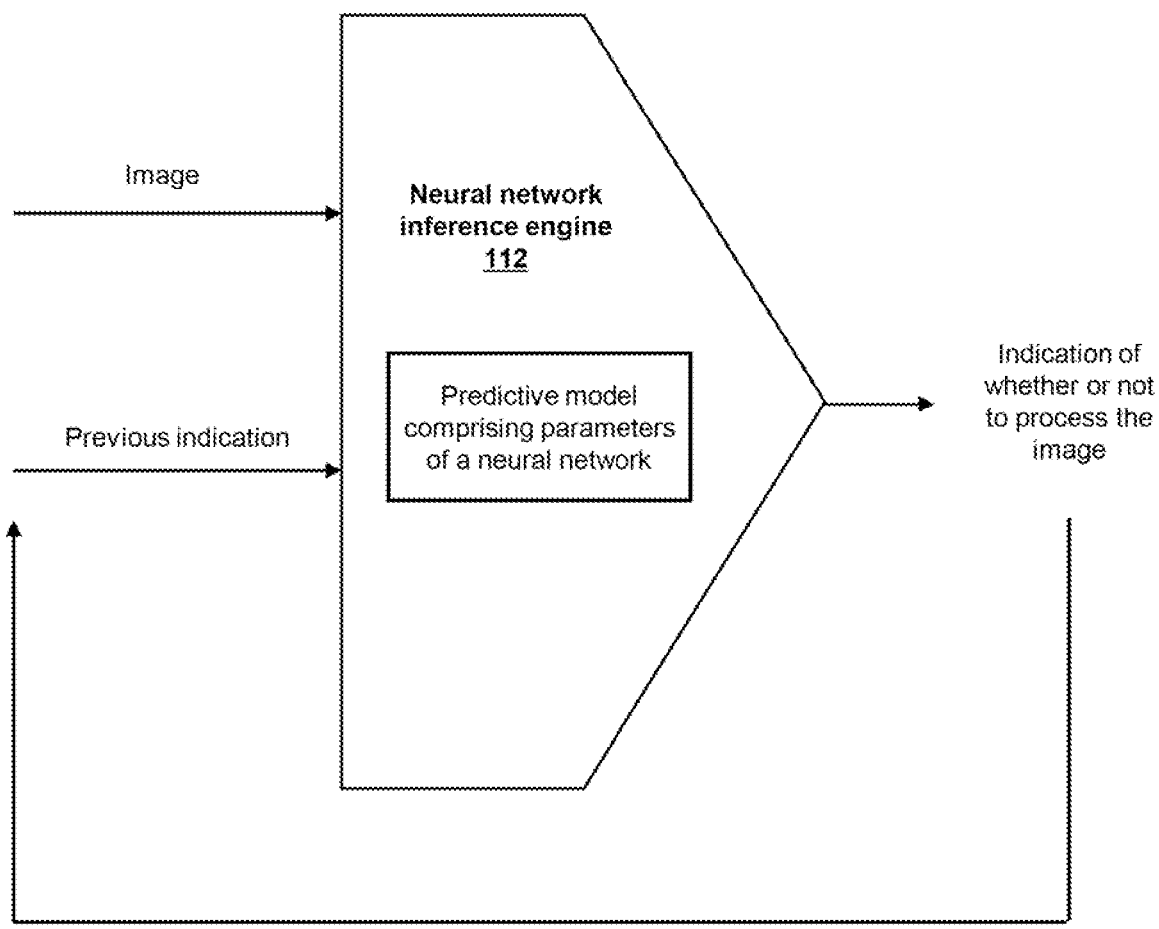
FIGS. 7A and 7B represent the neural network inference engine illustrated in FIG. 5 using additional input values.

FIG. 7A is a schematic representation of the neural network inference engine 112 for this implementation, illustrating the inputs and the outputs used by the neural network inference engine 112 when performing step 435 of the method 400.

In still another implementation applicable to the neural networks represented in FIGS. 6A and 6B, the inputs of the neural network include the image and an additional input value consisting of a number of persons present in a previous image of the image flow, where the previous image has been processed by the image processing module 116. In this case, the image processing module 116 implements the functionality (e.g. via another neural network) of determining the number of persons present in the image processed at step 445 of the method 400.

The determination of the number of persons present in a given image of the image flow (performed by the image processing module 116) is used as input of the neural network (at step 435) for at least one following image of the image flow, until a new determination is performed by the image processing module 116 for the next image in the image flow being processed by the image processing module 116.

For example, we consider three consecutive images img_1, img_2 and img_3 received consecutively at step 425 of the method 400. The processing of img_1 by the neural network at step 435 generates a positive indication, step 445 is performed and the image processing module 116 determines the number of persons nb_1 present in img_1, which is stored in the memory 120 of the computing device 100. For the processing of img_2 by the neural network at step 435, the inputs include img_2 and nb_1; and the processing by the neural network at step 435 generates a negative indication, step 445 is not performed. For the processing of img_3 by the neural network at step 435, the inputs include img_3 and nb_1; and the processing by the neural network at step 435 generates a positive indication, step 445 is performed and the image processing module 116 determines the number of persons nb_3 present in img_3, which is stored in the memory 120. Nb_3 is used as input for the processing by the neural network at step 435 of at least one following image of the image flow.

As mentioned previously, the flattening layer represented in FIGS. 6A and 6B comprises a dedicated neuron for receiving the number of persons present in the previous image processed by the image processing module 116 (the number of persons present in the previous image is not processed by the convolutional layer and optional pooling layer of FIG. 6B).

Figure 7B:
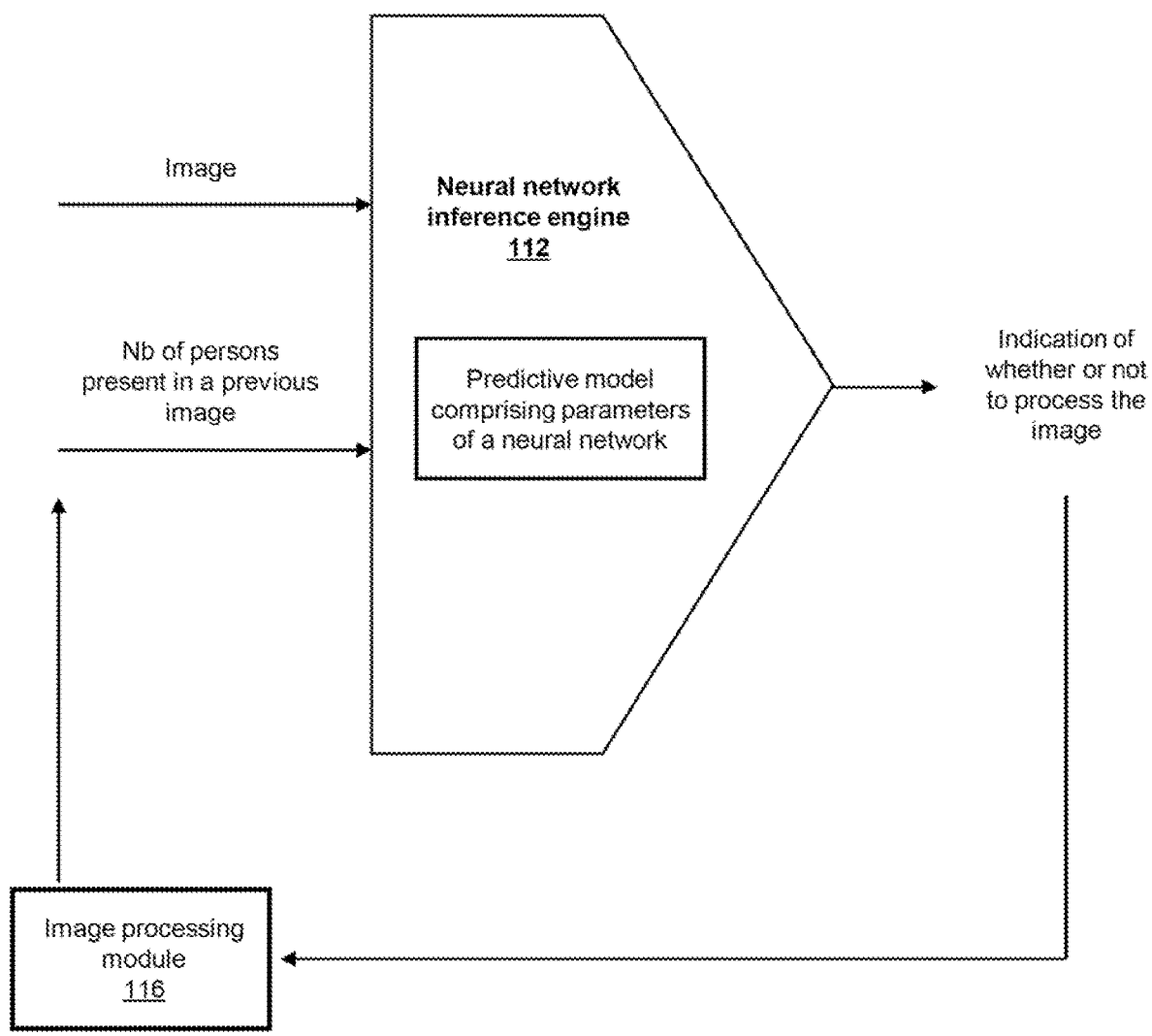

FIG. 7B is a schematic representation of the neural network inference engine 112 for this implementation, illustrating the inputs and the outputs used by the neural network inference engine 112 when performing step 435 of the method 400.

The present disclosure is not limited to the implementations of the neural network represented in FIGS. 6A, 6B, 7A and 7B. A person skilled in the art would readily understand that other implementations of the neural network implemented by the neural network inference engine 112 can be used for providing the functionalities performed by the method 400.

For example, the fully connected layers may be adapted to implement an auto-encoding functionality. In this case, as is well known in the art, the first layers among the fully connected layers perform an encoding functionality and the last layers among the fully connected layers perform a decoding functionality. The central layer(s) among the fully connected layers has (have) less neurons than the first (encoding) and last (decoding) layers among the fully connected layers, to perform a compression of the data at the central layer(s).

Figure 8:
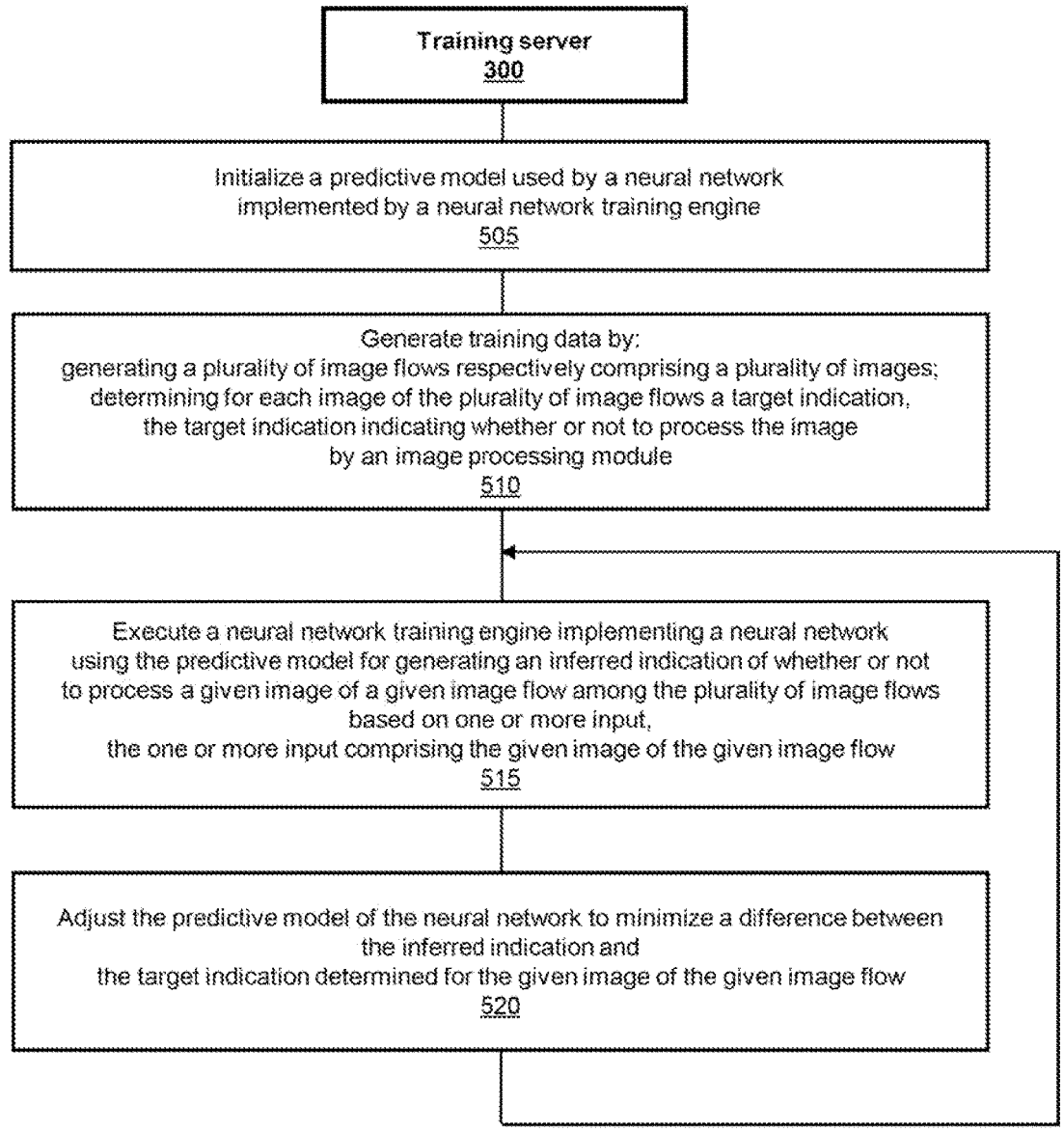
FIG. 8 illustrates a method implemented by the training server of FIG. 1, for training a neural network to determine whether or not to process images of an image flow.

Reference is now made concurrently to FIGS. 1, 2, 3, 4 and 8. FIG. 8 represents a method 500 for training a neural network to determine whether or not to process images of an image flow. At least some of the steps of the method 500 represented in FIG. 8 are implemented by the training server 300. The present disclosure is not limited to the method 500 being implemented by the training server 300, but is applicable to any type of computing device capable of implementing the steps of the method 500.

A dedicated computer program has instructions for implementing at least some of the steps of the method 500. The instructions are comprised in a non-transitory computer program product (e.g. the memory 320) of the training server 300. The instructions provide for training a neural network to determine whether or not to process images of an image flow, when executed by the processing unit 310 of the training server 300. The instructions are deliverable to the training server 300 via an electronically-readable media such as a storage media (e.g. CD-ROM, USB key, etc.), or via communication links (e.g. via a communication network through the communication interface 330).

The instructions of the dedicated computer program executed by the processing unit 310 implement the neural network training engine 311 and the control module 314. The neural network training engine 311 provides functionalities of a neural network, allowing to generate a predictive model ready to be used by the neural network inference engine 112 (executed by the computing device 100) at the end of the training, as is well known in the art. The control module 314 provides functionalities allowing the training server 300 to gather and process data used for the training of the neural network.

The method 500 comprises the step 505 of initializing a predictive model used by the neural network implemented by the neural network training engine 311. Step 505 is performed by the control module 314 executed by the processing unit 310 of the training server 300. The predictive model comprises various parameters which depend on the characteristics of the neural network implemented by the neural network training engine 311.

The initialization of the predictive model comprises defining a number of layers of the neural network, a functionality for each layer (e.g. convolutional layer, fully connected layer, etc.), initial values of parameters used for implementing the functionality of each layer, etc. The initialization of the predictive model is performed by a person highly skilled in the art of neural networks.

For example, the initialization of the parameters of a fully connected layer includes determining the number of neurons of the fully connected layer and determining an initial value for the weights of each neuron. Different algorithms (well documented in the art) can be used for allocating an initial value to the weights of each neuron. For example, each weight is allocated a random value within a given interval (e.g. a real number between −0.5 and +0.5), which can be adjusted if the random value is too close to a minimum value (e.g. −0.5) or too close to a maximum value (e.g. +0.5). In another example, the initialization of the parameters of a convolutional layer includes determining the size and values of the filter and the value of the stride.

A comprehensive description of the initialization of the predictive model is out of the scope of the present disclosure, since it is well known in the art of neural networks and is different for each type of layer (e.g. a fully connected layer, a convolutional layer, a pooling layer, etc.).

The data used for the initialization of the predictive model are received from a person via the user interface 340, and/or received from a remote computing device (not represented in FIG. 3) via the communication interface 330, and/or generated by a software program executed by the processing unit 310 (e.g. random generation of the initial value of the weights).

Although not represented in FIG. 8 for simplification purposes, the predictive model initialized at step 505 is stored in the memory 320 of the training server 300.

The method 500 comprises the step 510 of generating training data. The training data comprise a plurality of image flows, each image flow comprising a plurality of consecutive images. As illustrated in FIG. 2, one or more imaging sensor 200 can be used in different operating conditions, to generate the training image flows. The different operating conditions are adapted to the type of functionality implemented by the image processing module 116. For example, as mentioned previously, the image processing module 116 is used for determining the number of persons present in the images generated by the imaging sensor 200. In this case, the different operating conditions consist in having different numbers (e.g. 0, 1, 2, etc.) of persons being present/circulating in the field of view of the imaging sensor 200.

The training data also include a target indication indicating whether or not to process the image (by the image processing module 116) for each image of each image flow used for the training. For simplification purposes, the target indication of whether or not to process the image of an image flow will simply be referred to as the target indication in the following. The determination of the target indication varies, based on how the training process is implemented.

A unitary instance among the training data is commonly referred to as a tuple of training data. A tuple of training data includes the given image of the given image flow and the target indication determined for the given image. As mentioned previously, tuples of training data are generated for a plurality of image flows. The combination of all the tuples constitutes a set of training data used for the training implemented by the method 500.

In a first implementation, the target indication is determined by a user of the training server 300, possibly using image analysis software(s) for helping in the process of determining the value of the target indication. For a given image of a given image flow, the user determines if the given image is needed for adequately performing the functionality implemented by the image processing module 116. If the given image is needed, then the target indication is set to a value indicating that the image needs to be processed by the image processing module 116 (e.g. Boolean set to true, percentage set to 100%, etc.). If the given image is not needed, then the target indication is set to a value indicating that the image does not need to be processed by the image processing module 116 (e.g. Boolean set to false, percentage set to 0%, etc.). This manual procedure may be fastidious, time consuming, and possibly prone to errors. However, in the case where the procedure cannot be automated, this manual procedure needs to be used.

In a second implementation, the target indication is determined by an automated procedure, without user intervention (or at least a minimized user intervention). The possibility of automating the procedure for determining the value of the target indications for the training set of image flows depends on the type of functionality implemented by the image processing module 116. For example, as mentioned previously, the image processing module 116 is used for determining the number of persons present in the images generated by the imaging sensor 200. For a given image of a given image flow, a determination is made whether the number of persons present in the given image is different from the number of persons present in the previous image of the given image flow. If there is a difference, the target indication is set to a value indicating that the image needs to be processed by the image processing module 116 (e.g. Boolean set to true, percentage set to 100%, etc.). If there is no difference, then the target indication is set to a value indicating that the image does not need to be processed by the image processing module 116 (e.g. Boolean set to false, percentage set to 0%, etc.). By default, for the first image of any given image flow, the target indication is set to a value indicating that the image needs to be processed.

The image processing module 116 is used for determining the number of persons present in each image of each image flow used for the training. The image processing module 116 is executed by the processing unit 310 of the training server 300. The numbers of persons present in the training images (determined by the image processing module 116) are analyzed by the control module 314 (executed by the processing unit 310 of the training server 300), to determine the value of the target indication for each training image.

Alternatively, the image processing module 116 is only used during the operational phase (method 400 illustrated in FIG. 4) and another image processing software is used during the training phase (method 500 represented in FIG. 8) for determining the number of persons present in each image of each image flow used for the training.

Following is an illustration of the determination of the value of the target indication for a series of consecutive images of a given image flow (T means that the image needs to be processed and F that the image does not need to be processed).

TABLE 1

| Images | 1 | 2 | 3 | 4 | 5 | 6 | 7 | 8 | 9 | 10 | 11 | 12 | ... |
|---|---|---|---|---|---|---|---|---|---|---|---|---|---|
| Nb of persons present in the images | 0 | 0 | 1 | 1 | 2 | 2 | 2 | 1 | 1 | 0 | 0 | 0 | ... |
| Target indication of whether or not to process the image | T | F | T | F | T | F | F | T | F | T | F | F | ... |

In the case where an additional input value is used by the neural network, the additional input value is also determined at step 510 for each image of each image flow used for the training. This is applicable to any implementation of the training process.

For example, referring to FIG. 7A, for a given image of a given image flow, the inputs of the neural network include the given image and an additional input value consisting of the target indication of whether or not to process the previous image determined for the previous image in the given image flow. A tuple of training data includes the given image of the given image flow, the target indication determined for the previous image of the given image flow, and the target indication determined for the given image. For instance, referring to table 1, the following tuples are generated: [image 3, previous target indication F, determined target indication T], [image 4, previous target indication T, determined target indication F], [image 5, previous target indication F, determined target indication T], etc.

In another example, referring to FIG. 7B, for a given image of a given image flow, the inputs of the neural network include the given image and an additional input value consisting of a number of persons present in a previous image of the given image flow for which the corresponding indicator indicates that the previous image needs to be processed. A tuple of training data includes the given image of the given image flow, the number of persons present in a previous image of the given image flow for which the corresponding determined indicator indicates that the previous image needs to be processed, and the target indication determined for the given image.

For instance, referring to table 1, the following tuples are generated: [image 3, nb of images 0, determined target indication T], [image 4, nb of images 1, determined target indication F], [image 5, nb of images 1, determined target indication T], [image 6, nb of images 2, determined target indication F], etc.

The method 500 comprises the step 515 of executing the neural network training engine 311. The neural network training engine 311 implements the neural network using the predictive model for generating an output based on one or more input. The execution of the neural network training engine 311 is performed by the processing unit 310 of the training server 300.

The one or more input comprises a given image of a given image flow among the plurality of training data generated at step 510. The one or more input optionally comprises additional input value(s) corresponding to the given image (also generated at step 510). The output consists of an inferred indication of whether or not to process the given image of the given image flow.

The neural network implemented by the neural network training engine 311 corresponds to the neural network implemented by the neural network inference engine 112 (same input(s), same output(s), same number of layers, same functionality for each layer, same parameters used for implementing the functionality of each layer, etc.). As mentioned previously, FIGS. 6A and 6B are exemplary representations of such a neural network.

The method 500 comprises the step 520 of adjusting the predictive model of the neural network, to minimize a difference between the inferred indication (calculated at step 515) and the corresponding target indication (generated at step 510). The target indication has been determined for the given image of the given image flow used as input of the neural network at step 515. Step 520 is performed by the neural network training engine 311 executed by the processing unit 310 of the training server 300.

As is well known in the art, step 520 aims at minimizing a difference between output(s) calculated by the neural network and expected output(s) of the neural network, through the adjustment of the predictive model of the neural network (more specifically by adjusting parameters of the neural network comprised in the predictive model). For example, for a fully connected layer of the neural network, the adjustment comprises adjusting the weights associated to the neurons of the fully connected layer. In another example, for a convolutional layer of the neural network, the adjustment comprises adjusting the values of the filter used by the convolutional layer.

As is well known in the art, steps 515-520 are repeated for all the images of a given image flow, and for several image flows among the plurality of image flows comprised in the training data generated at step 610. The training data need to be large enough to properly train the neural network.

The implementation of the method 500 with respect to steps 510-520 may vary. For example, batches of N tuple(s) are selected among the training data, N being an integer greater or equal than 1. In addition to the previously mentioned components of a tuple, each tuple further comprises the inferred indication corresponding to the target indication determined for a given image of a given image flow. Step 515 is performed for the N tuple(s) of a given batch. Step 520 is performed taking into consideration the N output(s) of the neural network calculated at step 515. Thus, the adjustment of the predictive model at step 520 is performed by taking into consideration the N tuple(s) simultaneously. This process is repeated for each batch of N tuple(s). At the end of the process, a new set of batches of N tuple(s) may be selected and the process repeated.

Although not represented in FIG. 8 for simplification purposes, the modifications to the predictive model of the neural network performed at step 520 are stored in the memory 320 of the training server 300.

Steps 505, 510, 515 and 520 of the method 500 correspond to step 405 of the method 400 represented in FIG. 4.

At the end of the training phase, the neural network is considered to be properly trained (the predictive model of the neural network has been adjusted so that a difference between the expected outputs and the calculated outputs has been sufficiently minimized). The predictive model, comprising the adjusted parameters of the neural network, is transmitted to the computing device 100, as illustrated by step 410 of the method 400 represented in FIG. 4.

Test data are optionally used to validate the accuracy of the predictive model. The test data are different from the training data used at steps 510-515-520. This procedure well known in the art of neural networks is not represented in FIG. 8 for simplification purposes.

Various techniques well known in the art of neural networks can be used for performing step 520. For example, the adjustment of the predictive model of the neural network at step 520 uses back propagation. Other techniques, such as the usage of bias in addition to the weights (bias and weights are generally collectively referred to as weights in the neural network terminology), reinforcement learning, etc., may also be used.

Furthermore, the evaluation of the difference between the expected outputs and the calculated outputs of the neural network at step 520 may be implemented in different ways. In an exemplary implementation, the parameters of the neural network are adjusted so that each value of the inferred indication is substantially equal to the corresponding value of the target indication. A tolerance interval is usually used when performing the comparison between the calculated and expected values (e.g. a tolerance of 1% in absolute value is acceptable).

In a particular implementation, the neural network training engine 311 and the neural network inference engine 112 are implemented by the same computing device 100. In this case, the steps of the method 500 (represented in FIG. 8) and the steps of the method 400 (represented in FIG. 4) are performed by the same computing device 100 (the functionalities of the training server 300 are implemented by the computing device 100).

The training process may be implemented in two steps for a given type of imaging sensor 200. The method 500 is applied to a first imaging sensor of the given type, and a generic predictive model is generated. Then, for each other imaging sensor of the given type, the method 500 is applied using the generic predictive model at step 505, and generating a specific predictive model adapted to each specific imaging sensor of the given type. The quantity of training data for the second step is lower than the quantity of training data for the first step, since the second step consists of a fine-tuning of the training performed at the first step.

The two steps training process can also be applied in the context of a deployment at different customer premises. The generic predictive model is generated in a controlled training environment. At each specific customer premises, the generic predictive model is deployed, and a specific predictive model adapted to the characteristics of the specific customer premises is generated, by refining the generic predictive model. Ideally, the neural network automatically adjusts the generic predictive model and converges towards the adapted specific predictive model.

Fine-tuning of the generic predictive model into the specific predictive model can be achieved through reinforcement learning. As is well known in the art, a reinforcement signal is used for adapting the predictive model when reinforcement learning is implemented. The value of the reinforcement signal is one of positive reinforcement (also referred to as a positive reward) or negative reinforcement (also referred to as a negative reward). For example, the image processing module 116 is used for estimating the number of persons present in the images generated by the imaging sensor 200, under the control of the frame control functionality 114B (which determines which images are processed or not). The estimated number of persons present in the images determined by the image processing module 116 is compared to a real number of persons present in the images determined by other means (e.g. by a human being). The value of the reinforcement signal is calculated based on a difference between the estimated number of persons and the real number of persons (e.g. positive reinforcement if the estimated number of persons is equal to the real number of persons, and negative reinforcement otherwise).

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A computing device comprising:
a communication interface;
memory for storing a predictive model generated by a neural network training engine; and
a processing unit comprising one or more processor configured to:
receive an image via the communication interface, the image being part of an image flow received from an imaging sensor;
execute a neural network inference engine implementing a neural network, the neural network using the predictive model for generating an indication of whether or not to process the image based on one or more input of the neural network, the one or more input comprising the image and a previous indication of whether or not to process a previous image of the image flow;
determine whether or not to process the image by an image processing module based on the indication of whether or not to process the image;
process the image by the image processing module if the determination is positive and not process the image by the image processing module if the determination is negative; and
store the indication of whether or not to process the image in the memory, the indication being used as input of the neural network along with a following image of the image flow.

2. The computing device of claim 1, wherein the indication of whether or not to process the image is a Boolean value, and the image is processed by the image processing module if the Boolean value is true and the image is not processed by the image processing module if the Boolean value is false.

3. The computing device of claim 1, wherein the indication of whether or not to process the image is a percentage value, and the image is processed by the image processing module if the percentage value is greater or equal than a threshold and the image is not processed by the image processing module otherwise.

4. The computing device of claim 1, wherein the image processing module determines a number of persons present in the image.

5. The computing device of claim 1, wherein the processing unit:
receives a plurality of consecutive images of the image flow;
executes the neural network inference engine for each image among the plurality of consecutive images to generate a corresponding indication of whether or not to process the image for each image among the plurality of consecutive images;
determines whether or not to process a given image among the plurality of consecutive images by the image processing module based on the corresponding indication of whether or not to process the given image; and
processes the given image by the image processing module if the determination for the given image is positive and does not process the given image by the image processing module if the determination for the given image is negative.

6. The computing device of claim 1, wherein the image processing module has determined a previous number of persons present in the previous image of the image flow, the one or more input of the neural network further comprises the previous number of persons present in the previous image, if the determination based on the indication of whether or not to process the image is positive then the image is processed by the image processing module to determine a number of persons present in the image and the number of persons present in the image is used as input of the neural network along with at least one following image of the image flow, and if the determination based on the indication of whether or not to process the image is negative then the previous number of persons present in the previous image is used as input of the neural network along with at least one following image of the image flow.

7. The computing device of claim 1, wherein the neural network comprises a flattening layer, followed by a plurality of fully connected layers.

8. The computing device of claim 1, wherein the neural network comprises a convolutional layer, optionally followed by a pooling layer, followed by a flattening layer, followed by a plurality of fully connected layers.

9. The computing device of claim 1, wherein the imaging sensor is an infrared camera or a visual light camera.

10. A method using a neural network to determine whether or not to process images of an image flow, the method comprising:
(a) storing in a memory of a computing device a predictive model generated by a neural network training engine;
(b) receiving by a processing unit of the computing device an image of the image flow;
(c) executing by the processing unit of the computing device a neural network inference engine implementing the neural network, the neural network using the predictive model for generating an indication of whether or not to process the image based on one or more input of the neural network, the one or more input comprising the image and a previous indication of whether or not to process a previous image of the image flow;
(d) determining by the processing unit of the computing device whether or not to process the image by an image processing module executed by the processing unit of the computing device based on the indication of whether or not to process the image;
(e) processing the image by the image processing module if the determination is positive and not processing the image by the image processing module if the determination is negative; and
(f) storing the indication of whether or not to process the image in the memory of the computing device, the indication being used as input of the neural network along with a following image of the image flow.

11. The method of claim 10, wherein the image processing module determines a number of persons present in the image.

12. The method of claim 10, wherein steps (b), (c), (d), (e) and (f) are repeated for a plurality of consecutive images of the image flow.

13. The method of claim 10, wherein the image processing module has determined a previous number of persons present in the previous image of the image flow, the one or more input of the neural network further comprises the previous number of persons present in the previous image, if the determination based on the indication of whether or not to process the image is positive then the image is processed by the image processing module to determine a number of persons present in the image and the number of persons present in the image is used as input of the neural network along with at least one following image of the image flow, and if the determination based on the indication of whether or not to process the image is negative then the previous number of persons present in the previous image is used as input of the neural network along with at least one following image of the image flow.

14. The method of claim 10, wherein the neural network comprises a flattening layer, followed by a plurality of fully connected layers.

15. The method of claim 10, wherein the neural network comprises a convolutional layer, optionally followed by a pooling layer, followed by a flattening layer, followed by a plurality of fully connected layers.

16. The method of claim 10, wherein the image is received via a communication interface of the computing device from an infrared camera or from a visual light camera.

17. A method for training a neural network to determine whether or not to process images of an image flow, the method comprising:
(a) initializing by a processing unit of a computing device a predictive model of a neural network;
(b) generating by the processing unit of the computing device training data, the generation of the training data comprising:
generating a plurality of image flows, each image flow comprising a plurality of images; and
determining for each image of the plurality of image flows a target indication, the target indication indicating whether or not to process the image by an image processing module;
(c) executing by the processing unit of the computing device a neural network training engine implementing the neural network, the neural network using the predictive model for generating an inferred indication of whether or not to process a given image of a given image flow among the plurality of image flows based on one or more input, the one or more input comprising the given image of the given image flow; and
(d) adjusting by the processing unit of the computing device the predictive model of the neural network to minimize a difference between the inferred indication and the target indication determined for the given image of the given image flow;

wherein determining the target indication for the given image of the given image flow among the plurality of image flows comprises:

determining a number of persons present in the given image;

comparing the number of persons present in the given image with a previously determined number of persons present in a previous image of the given image flow; and if the compared numbers of persons are different then setting the target indication to a value indicating to process the given image else setting the target indication to a value indicating not to process the given image.

18. The method of claim 17, wherein steps (c) and (d) are repeated for several images of the given image flow and for several given image flows belonging to the plurality of image flows generated at step (b).

19. The method of claim 17, wherein initializing the predictive model comprises determining a number of layers of the neural network, determining a functionality for each layer of the neural network, and determining initial values of parameters used for implementing the functionality of each layer of the neural network.

20. The method of claim 19, wherein adjusting the predictive model of the neural network comprises adjusting the parameters used for implementing the functionality of each layer of the neural network.

21. The method of claim 17, wherein the one or more input of the neural network comprises an additional input value, and generating the training data further comprises determining the additional input value associated to each image of the plurality of image flows.

22. The method of claim 17, wherein the neural network comprises a flattening layer, followed by a plurality of fully connected layers.

23. The method of claim 17, wherein the neural network comprises a convolutional layer, optionally followed by a pooling layer, followed by a flattening layer, followed by a plurality of fully connected layers.

24. The method of claim 17, wherein generating the plurality of image flows comprises receiving the plurality of images of the plurality of image flows from an infrared camera or a visual light camera via a communication interface of the computing device.

* * * * *